United States Patent
Akimoto

(10) Patent No.: US 9,284,941 B2
(45) Date of Patent: Mar. 15, 2016

(54) NATURAL ENERGY EXTRACTION APPARATUS

(75) Inventor: Hiromichi Akimoto, Tokyo (JP)

(73) Assignee: ALBATROSS TECHNOLOGY LLC, Tokyo (JP)

( * ) Notice: Subject to any disclaimer, the term of this patent is extended or adjusted under 35 U.S.C. 154(b) by 244 days.

(21) Appl. No.: 14/118,850

(22) PCT Filed: Jul. 2, 2012

(86) PCT No.: PCT/JP2012/066848
§ 371 (c)(1),
(2), (4) Date: Nov. 19, 2013

(87) PCT Pub. No.: WO2013/005707
PCT Pub. Date: Jan. 10, 2013

(65) Prior Publication Data
US 2014/0102088 A1    Apr. 17, 2014

(30) Foreign Application Priority Data

Jul. 5, 2011   (JP) .................................. 2011-149017

(51) Int. Cl.
*F16D 31/02* (2006.01)
*F03B 17/06* (2006.01)
*F03B 13/26* (2006.01)

(52) U.S. Cl.
CPC ............... *F03B 17/065* (2013.01); *F03B 13/26* (2013.01); *F03B 17/062* (2013.01); *Y02E 10/223* (2013.01); *Y02E 10/28* (2013.01); *Y02E 10/38* (2013.01)

(58) Field of Classification Search
CPC .... F03B 13/264; F03B 17/062; F03B 17/065; Y02E 10/223; Y02E 10/28; Y02E 10/38

USPC .......................................... 60/398; 290/42, 53
See application file for complete search history.

(56) References Cited

U.S. PATENT DOCUMENTS 4,045,148 A    8/1977   Morin
5,230,215 A    7/1993   Nagata
(Continued)

FOREIGN PATENT DOCUMENTS

EP    2 080 899 A1    7/2009
FR    2 320 430 A2    3/1977
(Continued)

OTHER PUBLICATIONS

International Search Report issued in related application No. PCT/JP2012/063815, completed Jul. 31, 2012 and mailed Aug. 7, 2012.
(Continued)

*Primary Examiner* — Michael Leslie
(74) *Attorney, Agent, or Firm* — Griffin and Szipl PC

(57) ABSTRACT

An object of the present invention is to provide a natural energy extraction apparatus which can extract kinetic energies of river water currents or tidal water currents at various depth layers, and which is easy to attach to the fixed structure above water current. A natural energy extraction apparatus comprises a float, a vertical-axis water turbine fixed to the float and extending downward, a power transmission device engaging an upper end of the float and converting rotational kinetic energy of the float to driving torque for driven equipment, and arm members supporting the power transmission device rotatably around a horizontal axis at one ends and supported by a fixed structure above a water current rotatably around a horizontal axis at the other ends, wherein the float and the vertical-axis water turbine are located in a river water current or tidal water current.

5 Claims, 3 Drawing Sheets

(56) References Cited

U.S. PATENT DOCUMENTS

| | | | |
|---|---|---|---|
| 6,749,399 B2 | 6/2004 | Heronemus | |
| 7,397,144 B1 | 7/2008 | Brostmeyer | |
| 7,839,009 B2 * | 11/2010 | Rink | F03B 13/264 60/398 |
| 8,497,593 B2 * | 7/2013 | Klukowski | F03B 13/183 290/53 |
| 2003/0170123 A1 | 9/2003 | Heronemus | |
| 2004/0042895 A1 | 3/2004 | Seki | |
| 2009/0236858 A1 * | 9/2009 | Johnson | F03B 17/065 290/55 |
| 2014/0147248 A1 * | 5/2014 | Akimoto | F03D 11/045 415/3.1 |

FOREIGN PATENT DOCUMENTS

| | | |
|---|---|---|
| JP | 58-072677 A | 4/1983 |
| JP | 60-124587 U | 8/1985 |
| JP | 62-284967 A | 12/1987 |
| JP | 05-296136 A | 11/1993 |
| JP | 11-201018 A | 7/1999 |
| JP | 2003-206848 A | 7/2003 |
| JP | 2004-068777 A | 3/2004 |
| JP | 2005-519235 A | 6/2005 |
| JP | 2007-040217 A | 2/2007 |
| JP | 2008-063961 A | 3/2008 |
| WO | 03/076801 A2 | 9/2003 |
| WO | 03/089787 A1 | 10/2003 |
| WO | 2008/085056 A1 | 7/2008 |
| WO | 2012/058284 A1 | 5/2012 |

OTHER PUBLICATIONS

Written Opinion of the International Searching Authority issued in related application Mo. PCT/JP2012/063815, completed Jul. 31, 2012 and mailed Aug. 7, 2012.

International Search Report issued in corresponding application No. PCT/JP2012/066848, completed Sep. 18, 2012 and mailed Oct. 2, 2012.

Written Opinion of the International Searching Authority issued in corresponding application No. PCT/JP2012/066848, completed Sep. 18, 2012 and mailed Oct. 2, 2012.

Microfilm of the specification and drawings annexed to the request of Japanese Utility Model Application No. 011018/1984 (Laid open No. 124587/1985) (Meidensha Corp.), Aug. 22, 1985.

Extended European Search Report issued in corresponding application 12807564.5, completed Dec. 12, 2014 and mailed Dec. 22, 2014.

Korean Office Action issued in corresponding application 10-2013-7029870 dated Oct. 15, 2014, including a Japanese translation thereof.

Extended European Search Report issued in related application 12793316.6, completed Oct. 28, 2014 and mailed Nov. 3, 2014.

Communication issued in corresponding Korean application 9-5-2015-004767062 and Japanese translation thereof (no English translation available), dated Jan. 21, 2015.

* cited by examiner

NATURAL ENERGY EXTRACTION APPARATUS

This is a National Phase Application in the United States of International Patent Application No. PCT/JP2012/066848 filed Jul. 2, 2012, which claims priority on Japanese Patent Application No. 2011-149017, filed Jul. 5, 2011. The entire disclosures of the above patent applications are hereby incorporated by reference.

TECHNICAL FIELD

The present invention relates to a natural energy extraction apparatus

BACKGROUND ART

Patent Document No. 1 discloses a water current power generator comprising a horizontal-axis water turbine forming a float, a speed increasing gear train-power generator assembly engaging one end of the horizontal-axis water turbine, a speed increasing gear train-power generator assembly engaging the other end of the horizontal-axis water turbine, and a pair of arm members, wherein each arm member is fixed to a casing of one of the speed increasing gear train-power generator assemblies at one end and supported rotatably around a horizontal axis by a fixed structure above a water current at the other end, and the horizontal-axis water turbine floats on a river water surface.

PRIOR ART DOCUMENT

Patent Document

Patent Document No. 1: Japanese Patent Laid Open Publication No. 2007-040217

DISCLOSURE OF THE INVENTION

Problem to be Solved

The water current power generator of Patent Document No. 1 has a problem in that although the generator can extract kinetic energy of an upper layer river water current, it cannot extract kinetic energy of a middle or lower layer river water current. The water current power generator has another problem in that the pair of arm members connecting the pair of speed increasing gear train-power generator assemblies to the fixed structure above a water current are widely distanced from each other, so that the water current power generator is hard to attach to a bridge pier or other fixed structure above the water current.

Therefore, an object of the present invention is to provide a natural energy extraction apparatus which can extract kinetic energies of river water currents or tidal water currents at various depth layers, and which is easy to attach to a bridge pier or other fixed structure above a water current.

Means for Achieving the Object

In accordance with the present invention, there is provided a natural energy extraction apparatus comprising a float, a vertical-axis water turbine fixed to the float and extending downward, a power transmission device engaging an upper end of the float and converting rotational kinetic energy of the float to driving torque for driven equipment, and arm members supporting the power transmission device rotatably around a horizontal axis at one ends and supported by a fixed structure above a water current rotatably around a horizontal axis at the other ends, wherein the float and the vertical-axis water turbine are located in a river water current or tidal water current.

In the natural energy extraction apparatus of the present invention, a vertical-axis water turbine extracts kinetic energy of a river water current or tidal water current, so that the energy extraction apparatus of the present invention can extract kinetic energies of not only a surface layer water current but also a middle layer water current and a lower layer water current. Therefore the natural energy extraction apparatus of the present invention can extract kinetic energies of river water currents or tidal water currents at various layers of wide depth range. In the natural energy extraction apparatus of the present invention, the power transmission device engages the float fixed to the upper end of the vertical-axis water turbine, so that the distance between one of the pair of arms and the other of the pair of arms for connecting the power transmission device to the fixed structure above a water current is narrower than that between one of the pair of arms and the other of the pair of arms for connecting the casings of the pair of speed increasing gear train-power generator assemblies, each engaging one of the opposite ends of the horizontal-axis water turbine, to the fixed structure above a water current. Therefore, the natural energy extraction apparatus of the present invention can be easily attached to a bridge pier or other fixed structure above a water current.

In accordance with a preferred aspect of the present invention, the natural energy extraction apparatus further comprises a weight fixed to or suspended from a lower end of a vertical rotating shaft of the vertical-axis water turbine.

When the natural energy extraction apparatus further comprises a weight fixed to or suspended from a lower end of a vertical rotating shaft of the vertical-axis water turbine, the vertical-axis water turbine is prevented from excessive inclination caused by a water current, and decrease of kinetic energy extraction efficiency owing to excessive inclination of the vertical-axis water turbine is prevented.

In accordance with a preferred aspect of the present invention, the vertical-axis water turbine is provided with arms radially extending from a vertical rotating shaft of the water turbine to connect with blades of the water turbine, thereby supporting the blades, and a cover of hydrofoil-shaped cross section is fixed to each arm.

In accordance with a preferred aspect of the present invention, the vertical-axis water turbine is provided with arms radially extending from a vertical rotating shaft of the water turbine to connect with blades of the water turbine, thereby supporting the blades, a cover of hydrofoil-shaped cross section is attached to each arm, and the whole body of the cover can rotate around a longitudinal axis of the arm, or a trailing edge portion of the cover can rotate around an axis parallel to the longitudinal axis of the arm, When the vertical-axis water turbine is provided with arms radially extending from a vertical rotating shaft of the water turbine to connect with blades of the water turbine, each arm is desirably provided with a cover of hydrofoil-shaped cross section in order to decrease hydraulic resistance of the arm.

When the aspect ratio of the cover is large, induced drag is small and lift-drag ratio is large. Therefore, it is desirable to fix the cover to the arm, thereby making the lift generated by the cover contribute to generation of torque by the vertical-axis water turbine. On the other hand, when the aspect ratio of the cover is small, induced drag is large and lift-drag ratio is small. Therefore, it is desirable to make the cover or the trailing edge portion of the cover rotatable, thereby restraining generation of lift and drag by the cover.

In accordance with another aspect of the present invention, there is provided a water current power generator comprising any one of the aforementioned natural energy extraction apparatuses, wherein the driven equipment is a power generator.

The water current power generator of the present invention can extract kinetic energies of river water currents or tidal water currents at various layers of wide depth range, and can be easily attached to a fixed structure above a water current.

MODES FOR CARRYING OUT THE INVENTION

A water current power generator which is an application of a natural energy extraction apparatus in accordance with a preferred embodiment of the present invention will be described.

Figure 1:
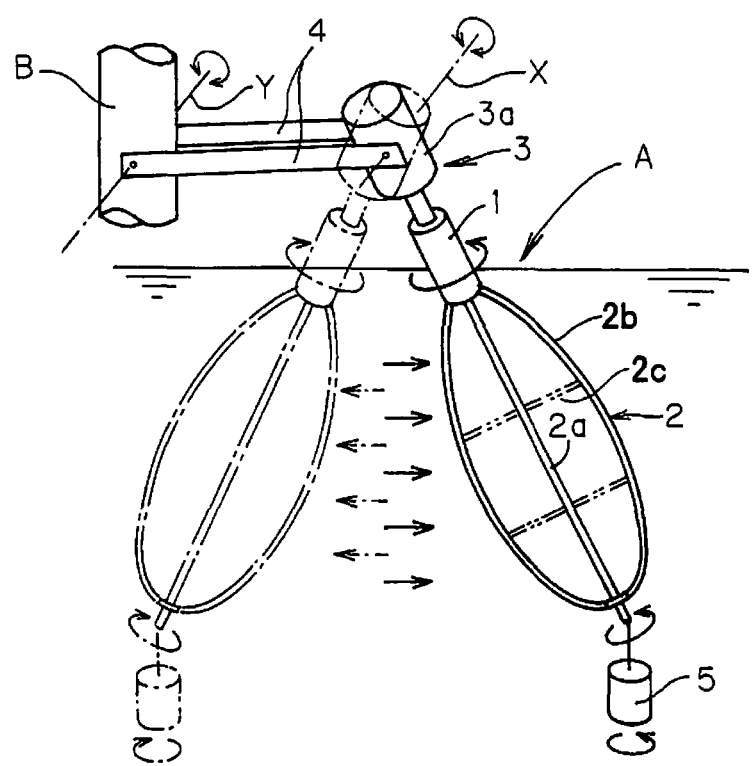
FIG. 1 is a perspective view of a water current power generator, which is an application of a natural energy extraction apparatus in accordance with a preferred embodiment of the present invention.

As shown in FIG. 1, a water current power generator A comprises a float 1 of cylindrical shape, a vertical-axis water turbine 2 fixed to the lower end of the float 1 and extending downward, a speed increasing gear train-power generator assembly 3 comprising a speed increasing gear train engaging the upper end of the float 1 and a power generator driven by the speed increasing gear train, and a pair of arm members 4 supporting a casing 3a of the speed increasing gear train-power generator assembly 3 rotatably around a horizontal axis X at one ends and supported rotatably around a horizontal axis Y extending parallel to the axis X by a fixed structure B located above a water current at the other ends. The speed increasing gear train and the power generator are not shown in FIG. 1.

A weight 5 is suspended from the lower end of a vertical rotating shaft 2a of the vertical-axis water turbine 2.

The float 1 and the vertical-axis water turbine 2 are located in a river water current or tidal water current.

The water current power generator A is floated in the water current by the buoyancy of the float 1. The speed increasing gear train-power generator assembly 3 is located above the water current.

In the water current power generator A, the vertical-axis water turbine 2 located in the water current rotates to rotate the float 1 fixed to the upper end of the vertical-axis water turbine 2, and the power generator of the speed increasing gear train-power generator assembly 3 supported by the fixed structure B through the arm members 4 and engaging the float 1 generates electric power.

As indicated by solid lines in FIG. 1, the vertical-axis water turbine 2 is forced by the water current to swing around the horizontal axis X, thereby inclining toward the downstream side. Therefore, no excessive horizontal force is impressed on the vertical-axis water turbine 2 by the water current. As a result, engaging portions between the arm members 4 and the casing 3a of the speed increasing gear train-power generator assembly 3 and engaging portions between the arm members 4 and the fixed structure B are protected from damage.

The weight 5 suspended from the lower end of the vertical rotating shaft 2a of the vertical-axis water turbine 2 generates restoring moment to prevent excessive inclination of the vertical rotating axis water turbine 2 caused by the water current, thereby preventing decrease of efficiency of electric power generation caused by the excessive inclination of the vertical-axis water turbine 2. The weight 5 can be fixed to the lower end of the vertical rotating shaft 2a instead of being suspended from the lower end of the vertical rotating shaft 2a. Fluctuation of the level of the water surface is soaked up by swinging of the arm members 4 around the horizontal axis Y. Therefore, the float 1 and the vertical-axis water turbine 2 can stay located in the water current irrespective of the fluctuation of the water surface level.

When the water current power generator A is located at a river-mouth or a channel, the direction of the water current reverses due to ebb and flow of the tide. In this case, the casing 3a of the speed increasing gear train-power generator assembly 3 rotates around the horizontal axis X as indicated by alternate long and short dash lines in FIG. 1, and the vertical-axis water turbine 2 follows the casing 3a to swing around the horizontal axis X, thereby inclining toward downstream. Therefore, no excessive horizontal force is impressed on the vertical-rotating axis water turbine 2 by the water current. As a result, engaging portions between the arm members 4 and the casing 3a of the speed increasing gear train-power generator assembly 3 and engaging portions between the arm members 4 and the fixed structure B are protected from damage.

In the water current power generator A, the vertical-axis water turbine 2 extracts kinetic energy of a river water current or tidal water current, so that the water current power generator A can extract kinetic energy of not only a surface layer water current but also a middle layer water current and a lower layer water current. Therefore the water current power generator A can extract kinetic energies of river water currents or tidal water currents at various layers of wide depth range. The speed increasing gear train-power generator assembly 3 is located above the water current, so that a space for accommodating the power generator is reliably prevented from inundation. In the water current power generator A, the speed increasing gear train-power generator assembly 3 engages the upper end of the float 1 fixed to the upper end of the vertical-axis water turbine 2, so that the distance between the pair of arm members 4 for connecting the casing 3a of the speed increasing gear train-power generator assembly 3 to the fixed structure B above the water current is narrower than that between one of the pair of arms and the other of the pair of arms for connecting the pair of speed increasing gear train-power generator assemblies, each engaging one of the opposite ends of the horizontal-axis water turbine, to the fixed structure above the water current. Therefore, the water current power generator A can be easily attached to a bridge pier or other fixed structure B above a water current.

When the water current power generator A is provided with arms 2c radially extending from a vertical rotating shaft 2a to connect with hydrofoils 2b of large length, which are the blades of the vertical-axis water turbine 2, thereby supporting the hydrofoils 2b, each arm 2c is desirably provided with a cover of hydrofoil-shaped cross section in order to decrease fluid resistance of the arm 2c.

Figure 2:
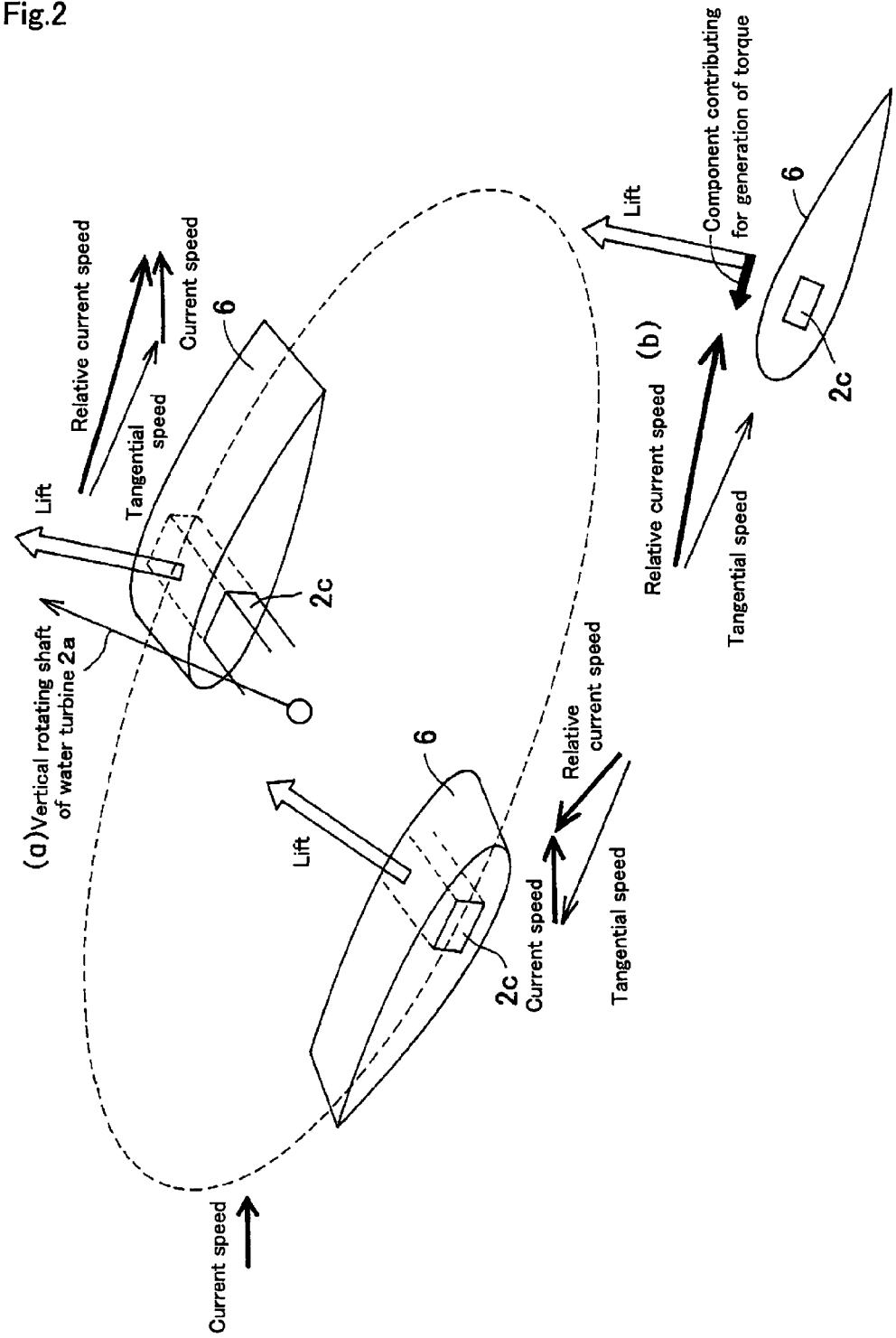
FIG. 2 is a set of partial structural views of an arm of a water current power generator, which is an application of a natural energy extraction apparatus in accordance with a preferred embodiment of the present invention, and a cover of hydrofoil-shaped cross section connected to the arm. (a) is a perspective view, and (b) is a sectional view.

As can be seen from FIG. 1, the vertical-axis water turbine 2 inclines toward downstream of the water current during operation of the water current power generator A, and the cover 6 of hydrofoil-shaped cross section has an attack angle against relative water current as shown in FIG. 2(a) to generate lift and also induced drag at wing tip. Therefore, influence of lift and induced drag on the torque generated by the vertical-axis water turbine 2 should be considered.

As shown in FIG. 2(b), the lift inclines toward the leading edge of the cover 6. Therefore, the lift contributes torque generation by the vertical-axis water turbine 2. When the aspect ratio of the cover 6 is large, induced drag is small and lift-drag ratio is large. Therefore, the cover 6 of large aspect ratio fixed to the arm 2c contributes torque generation by the vertical-axis water turbine 2.

Figure 3:
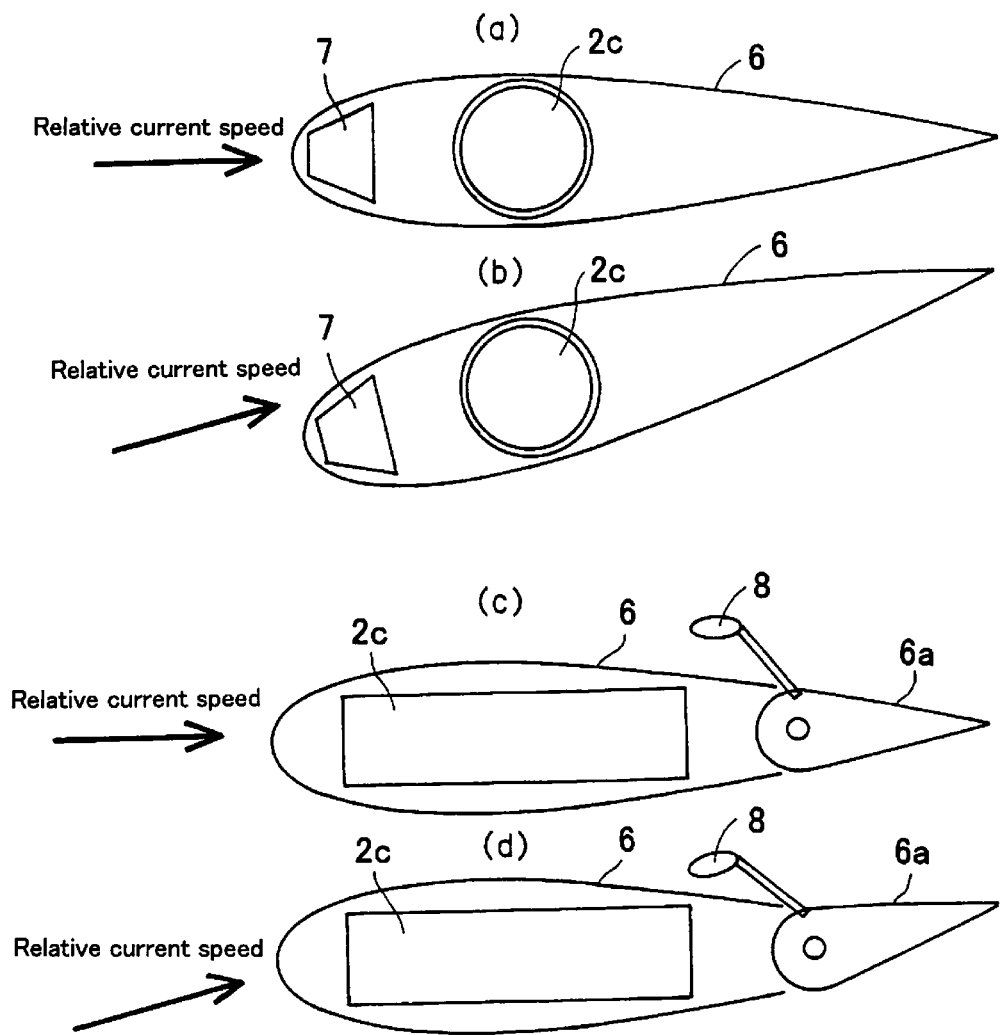
FIG. 3 is a set of cross sectional views of an arm of a water current power generator, which is an application of a natural energy extraction apparatus in accordance with a preferred embodiment of the present invention, and a cover of hydrofoil-shaped cross section connected to the arm.

When the aspect ratio of the cover 6 is small, induced drag is large and lift-drag ratio is small. Thus, the cover 6 becomes a hindrance to torque generation by the vertical-axis water turbine 2. Therefore, as shown in FIGS. 3(a) and 3(b), the cover 6 of small aspect ratio is desirably attached to the arm 2c rotatably around the longitudinal axis of the arm 2c so as not to have an attack angle against the relative water current, thereby restricting generation of lift and induced drag by the cover 6. The cover 6 should be provided with a balance weight 7 inside or outside of the leading edge portion.

When the aspect ratio of the cover 6 is small, as shown in FIGS. 3(c) and 3(d), a trailing edge portion 6a of the cover 6, which is fixed to the arm 12c at the longitudinal middle of its chord length, can be made rotatable around an axis extending parallel to the longitudinal axis of the arm 2c so as to make the trailing edge portion 6a have no attack angle against the relative water current, thereby restricting generation of lift and induced drag by the trailing edge portion 6a and decreasing induced drag generated by the cover 6. The trailing edge portion 6a should be provided with a balance weight 8 at the leading edge portion.

In the aforementioned preferred embodiments, rotational kinetic energy of the float 1 is converted to driving torque for the generator of the speed increasing gear train-power generator assembly 3, and finally taken out as electric energy. However, it is possible, instead of converting the rotational kinetic energy of the float 1 to electric energy, to convert the rotational kinetic energy of the float 1 directly to driving torque for a pump, compressor, separately installed energy storing apparatus such as a flywheel, etc.

The vertical-axis water turbine used in the present invention is not restricted to that of a particular type. Turbines of various types such as a Darrieus type turbine, a Giromill type turbine, a Savonius type turbine, and a Cross-flow type turbine can be used.

INDUSTRIAL APPLICABILITY

The present invention can be widely used for a natural energy extraction apparatus, such as a small sized water current power generator, etc. which is attached to a bridge pier or other fixed structure above a water current.

BRIEF DESCRIPTION OF THE REFERENCE NUMERALS

A Water current power generator
B Fixed structure
X, Y Horizontal axis
1 Float
2 Vertical-axis water turbine
2a Vertical rotating shaft
2b Hydrofoil
2c Arm
3 Speed increasing gear train-power generator assembly
3a Casing
4 Arm member
5 Weight
6 Cover
7, 8 Balance weight

The invention claimed is:

1. A natural energy extraction apparatus comprising a float, a vertical-axis water turbine fixed to the float and extending downward, a power transmission device engaging an upper end of the float and converting rotational kinetic energy of the float to driving torque for driven equipment, and arm members supporting the power transmission device rotatably around a horizontal axis at one ends and supported by a fixed structure above a water current rotatably around a horizontal axis at the other ends, wherein the float and the vertical-axis water turbine are located in a river water current or tidal water current.

2. A natural energy extraction apparatus of claim 1, further comprising a weight fixed to or suspended from a lower end of a vertical rotating shaft of the vertical-axis water turbine.

3. A natural energy extraction apparatus of claim 1, wherein the vertical-axis water turbine is provided with arms radially extending from a vertical rotating shaft of the water turbine to connect with blades of the water turbine, thereby supporting the blades, and a cover of hydrofoil-shaped cross section is fixed to each arm.

4. A natural energy extraction apparatus of claim 1, wherein the vertical-axis water turbine is provided with arms radially extending from a vertical rotating shaft of the water turbine to connect with blades of the water turbine, thereby supporting the blades, a cover of hydrofoil-shaped cross section is attached to each arm and the cover is as a whole body enabled to rotate around a longitudinal axis of the arm, or a trailing edge portion of the cover is enabled to rotate around an axis parallel to the longitudinal axis of the arm.

5. A water current power generator comprising the natural energy extraction apparatus of claim 1, wherein the driven equipment is a power generator.

\* \* \* \* \*